United States Patent [19]

Saneski

[11] Patent Number: 4,839,907
[45] Date of Patent: Jun. 13, 1989

[54] CLOCK SKEW CORRECTION ARRANGEMENT

[75] Inventor: Steven P. Saneski, Somerset, N.J.

[73] Assignee: American Telephone and Telegraph Company, AT&T Bell Laboratories, Murray Hill, N.J.

[21] Appl. No.: 161,066

[22] Filed: Feb. 26, 1988

[51] Int. Cl.[4] .............................................. H04L 7/06
[52] U.S. Cl. ...................................... 375/113; 371/1; 371/61
[58] Field of Search ............... 375/106, 113, 111, 118; 371/1, 61, 67, 68; 360/26; 328/55, 63; 307/265, 269

[56] References Cited

U.S. PATENT DOCUMENTS

| | | | |
|---|---|---|---|
| 3,728,679 | 4/1973 | McIntosh | 371/1 |
| 3,792,436 | 2/1974 | DeVoy et al. | 371/1 |
| 3,927,392 | 12/1975 | Caron | 371/1 |
| 4,447,870 | 5/1984 | Tague et al. | 364/200 |
| 4,479,216 | 10/1984 | Krambeck et al. | 371/61 |
| 4,482,819 | 11/1984 | Oza et al. | 307/269 |
| 4,503,490 | 3/1985 | Thompson | 371/61 |
| 4,637,018 | 1/1987 | Flora et al. | 371/1 |
| 4,677,618 | 6/1987 | Haas et al. | 360/26 |
| 4,682,342 | 7/1987 | Vetani | 371/1 |

Primary Examiner—Robert L. Griffin
Assistant Examiner—Stephen Chin
Attorney, Agent, or Firm—Jack S. Cubert

[57] ABSTRACT

A skew compensation circuit removes skew between a data stream and the clock of a processing module to which the data stream clocked at the same frequency is applied. A delayed data stream is generated. Either the data stream or the delayed data stream is selected to be clocked in the processing module. The selected data stream and a delayed version of the selected data stream are compared at prescribed transitions of the processing module clock to detect differences between the state of the selected data stream signal at the clock transition and the state of the delayed selected data signal. In the event of a detected difference in states, the other of the input data stream and the delayed data stream is selected for clocking in the processing module.

11 Claims, 8 Drawing Sheets

CLOCK SKEW CORRECTION ARRANGEMENT

BACKGROUND OF THE INVENTION

My invention relates to digital signal processing systems and more particularly to arrangements for clocking digital signals subject to timing variations.

Data processing and communication systems generally comprise groups of interconnected modules each of which contains one or more circuit units. In frequency synchronous clocking arrangements, the clock operates at a predetermined frequency and is used to coordinate the processing operations that take place in the different modules. The clock operating rate is fixed but the relative timing between the clock and digital signals at various locations in the system module can differ significantly. As is well known in the art, propagation time variations in both the clock and signal distribution cause significant differences in the phasing between signal and clock pulses in transfers from module to module and from circuit unit to circuit unit within a module. The difference in phasing or skewing of data signal timing with respect to the clock may be overcome by retiming or clocking the digital signals subjected to timing variations at prescribed points as the digital signals are transferred from one portion to another portion of the system. The clocking of digital signals at selected points in the modules re-establishes the proper phase relationship between the digital signals and the clock pulses so that skewing is eliminated.

Skew in the aforementioned digital signal processing systems is generally the result of propagation time variations which occur between integrated circuit chips due to manufacturing process tolerances and propagation time variations in varying length paths for signals and clocking pulses. One way known to minimize skew disclosed in U.S. Pat. No. 4,447,870 issued to S. A. Tague et al May 8, 1984 and elsewhere is dependent on the manual adjustment of the clock distribution system. Such manual or operator controlled adjustment requires considerable time, effort and expense and must be repeated if components of the system are changed.

U.S. Pat. No. 4,482,819 issued to B. J. Oza et al Nov. 13, 1984 discloses a data processor system clock checking circuit in which a central clock generator generates a plurality of odd and even clock pulses which are distributed to a plurality of modules on equal length lines and a plurality of gate pulses on varying length lines. A detection circuit at a module detects if the gate pulse and the clock pulse begin and end in proper sequence and provides an indication of an improper sequence. The processor system may be stopped on occurrence of an improper sequence indicating signal. The arrangement, however, does not automatically correct skew between data signals incoming to a module and the module clock.

U.S. Pat. No. 4,479,216 issued to R. H. Kramback et al on Oct. 23, 1984 discloses a skew-free clock circuit for integrated circuit chips in which an op-amp feedback arrangement is used to provide non-skewed clock pulses from a source of skewed clock pulses. Skew in the clock-in pulses results in a change in the average voltage of the output clock pulse which average voltage is compared to a reference. A control signal obtained from the comparison, adjusts the average voltage of at the output. The operation of the feedback and comparison circuit, however, may not be sufficiently fast to accommodate rapid and variable changes in signals.

Another solution to clock skew disclosed in U.S. Pat. No. 4,637,018 issued Jan. 13, 1987 to L. P. Flora et al employs feedback circuitry including a multi-tapped delay line and an accurate constant delay in conjunction with a phase comparator for automatically adjusting the chip propagation delay of each clock distribution chip to provide substantially the same constant predetermined delay relative to the main-system clock for the output clocks provided by the clock distribution system. The circuit arrangement to accomplish such automatic adjustment, however, is complex, and does not operate well in equipment where propagation delays of the data signals are highly uncertain. It is an object of the invention to provide an improved skew compensation circuit that rapidly accommodates highly variable skew between data signals and clock pulses.

SUMMARY OF THE INVENTION

The foregoing object is achieved by recognizing a predetermined time period during which the state of a data signal is uncertain, detecting when the uncertainty period occurs in the vicinity of a clock transition and shifting the data signal to remove the uncertainty period from the clock transition. Advantageously, the detection and shifting provides automatic skew compensation without complex feedback arrangements.

The invention is directed to an arrangement for clocking an input data stream to eliminate skew with respect to clock in which a version of the input data having a predetermined delay is generated. Either the input data or the delayed input data is selected to be clocked. The selected data and a delayed version of the selected data are compared at prescribed clock transitions. In the event that the state of the selected data signal is different from the state of the delayed selected data signal, an uncertainty signal is produced and the other of the input data signal and the input data signal having the predetermined delay is selected.

DETAILED DESCRIPTION

Figure 1:
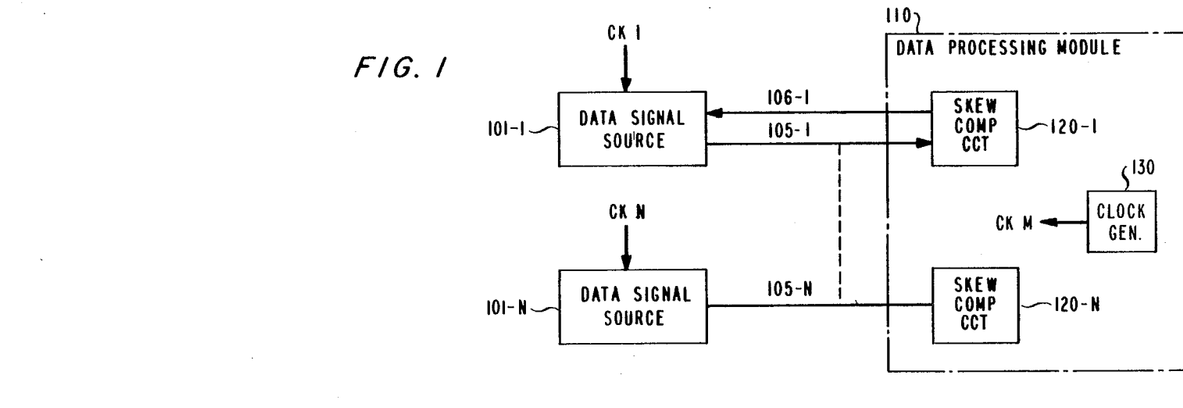
FIG. 1 is a general block diagram of an arrangement of digital processing modules which includes a skew compensation circuit illustrative of the invention.

FIG. 1 shows a general block diagram of a digital signal processing arrangement in which a plurality of modules are interconnected to perform an assigned task. As illustrated, a set of data source modules 101-1 through 101-N are connected to data processing module 110 via lines 105-1 through 105-N. The arrangement of FIG. 1 may constitute a data processing system in which data sources 101-1 through 101-N are peripheral devices each of which is individually connected to central processing module 110. Alternatively, the arrangement of FIG. 1 may be a communication system in which data sources 101-1 through 101-N are individual remote terminals connected to processing module 110 operating as a communication switch. Dat signal source 101-1 is also connected to processor module 106-1 to provide a separate data stream path.

Each data source module and processing module 110 in FIG. 1 operates under control of locally generated clock signals. Clock generator 130 provides clock signal ckM in module 110. Each data signal source includes a local clock generator to provide clock signals ck1, ck2, ..., ckN. All clock signals are synchronized by arrangements well known in the art so that they operate at the same frequency and are therefore frequency synchronous. In a data processing system, all clock signals may be derived from a single clock source by clock distribution arrangements well known in the art. In a communication arrangement, frequency synchronous clock signals at remote terminals may be obtained by one of the many well known clock recovery schemes. Data signal source 101-1 is served by clock signals ck1; data signal source 101-N in FIG. 1 is served by clock signals ckN; and processing module 110 is served by clock signals ckM.

Clock signals ckl through ckN and ckM all operate at the same transition rate but the phasing among the clock signals exhibits considerable variation owing to the variations in delay of the individual clock signal paths. The relationship between the phase of the data signal streams arriving at processing module 110 from the different data signal modules and clock ckM is also subject to variation because of different path lengths along lines 105-1 through 105-N. Consequently, it is necessary to adjust the phase of the data signals entering module 110 from each data signal source to eliminate the clockdata signal skew. Such data signal skew with respect to the clock generally remains constant during normal operation although the skew is usually different for each data signal source. Thus, compensation for skew is performed only when the system or one or more of its modules is placed into operation. This may be done using special signals when the system or its modules are put into operation or by using the initial data signal at the time of a data transfer between modules.

Figure 3:
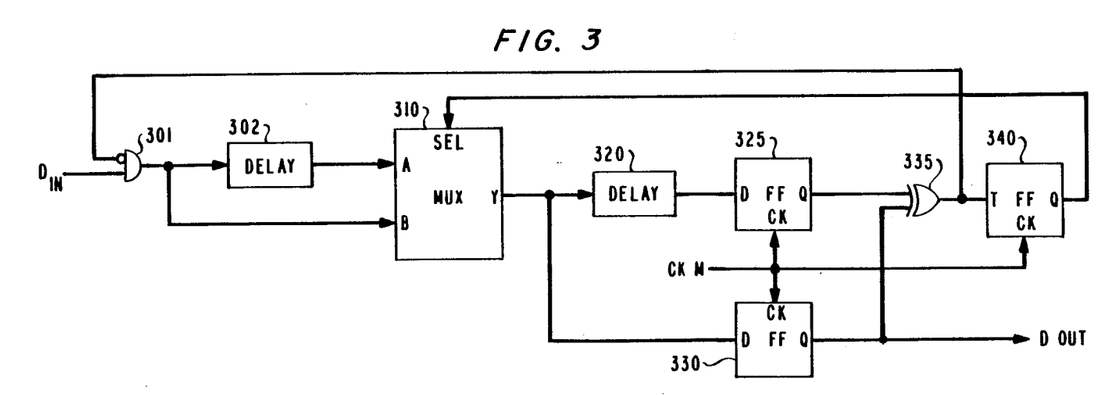
FIG. 3 is a detailed block diagram of a circuit used to compensate for data signal skew incoming to a processing module that is illustrative of the invention.

In the arrangement of FIG. 1, data signals from each of sources 101-1 through 101-N enter the processing module through its respective one of skew compensation circuit 120-1 through 120-N. One type of compensation circuit is shown in detail in FIG. 3. The skew compensation circuit of FIG. 3 is operative to recognize a predetermined time period during which a data signal is in process of a transition so that its state is uncertain and to detect if the uncertainty period occurs within a prescribed vicinity of a clock transition. The occurrence of a data signal transition at a clock transition may render the clocked data signal output indeterminate. Where the data signal transition is within the prescribed vicinity of the clock transition, the data signal which enter the processing module are shifted in phase to remove the data signal uncertainty period from the times of occurrence of clock transitions.

Figure 2:
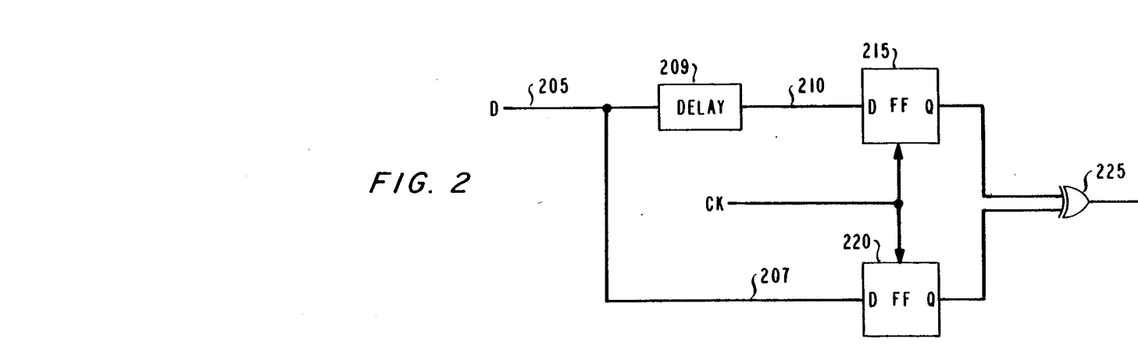
FIG. 2 is a detailed block diagram of a circuit for determining uncertainty time periods in a data signal stream that is illustrative of the invention.
Figure 6:
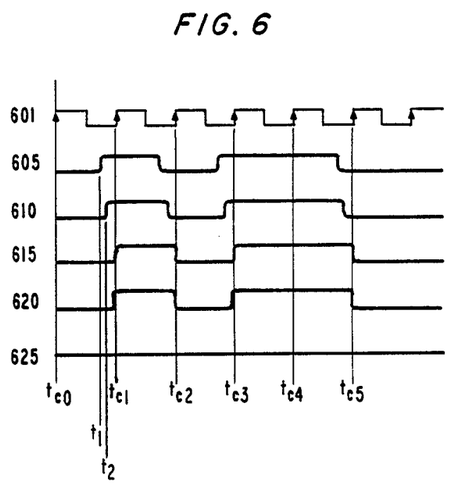
FIGS. 6 and 7 shows waveforms illustrating the operation of the circuit of FIG. 2.
Figure 7:
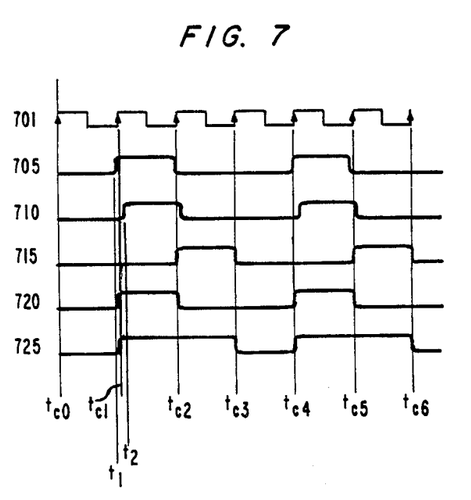

FIG. 2 shows a detailed block diagram of a circuit adapted to detect the occurrence of data signal uncertainty in the vicinity of a clock transition and FIGS. 6 and 7 show waveforms that illustrate its operation. The circuit of FIG. 2 comprises delay line 209, data type flip flops 215 and 220, and EXCLUSIVE OR gate 225. While delay line 209 is shown as a separate device, the delay function may be obtained using the difference in the time of operation of flip flop 215 and the time of operation of flip flop 220. Consequently delay line 209 is included to clearly illustrate the principles of operation and may not be needed in a practical circuit.

In FIG. 2, a data signal stream from a data signal source e.g. source 101-1 is applied via leads 205 and 207 to the D or data input of flip flop 220 and via lead 205, short delay 209 and lead 210 to the data input of flip flop 215. Each of these flip flops is triggered by the positive going transitions of processing module clock signal ckM. The waveforms of FIG. 6 illustrate the operation of the circuit of FIG. 2. The data signal input on lead 205 (waveform 605) can have transitions at times determined by the clock of the source module (ck1) and the propagation time along the path over line 105-1 to module 110. The clock signal ckM of processing module 110 is shown in waveform 601. The upward directed arrows at times tc0, tc1, tc2 ... on waveform 601 indicate that each of flip flops 215 and 220 is triggered to the state of its data input at the positive transitions of the clock signal. The data signal applied to the data input of flip flop 220 from data source 101-1 and to the input of delay 209 is shown in waveform 605. Waveform 610 shows the delayed data signal applied from delay 209 to the data input of flip flop 215. The output of flip flop 215 is shown in waveform 615. The output of flip flop 220 is shown in waveform 620 and the output of EXCLUSIVE OR gate 225 is shown in waveform 625. As is well known in the art, the output of an EXCLUSIVE OR gate is in one state, e.g. high, when its inputs are in different states and is in the opposite state, low, when both inputs are in the same state.

Data signal waveform 605 in FIG. 6 makes a positive transition at time t1 prior to the positive clock transition tc1 of waveform 601 and delayed waveform 610 also goes positive at time t2 prior to the positive clock transition at time tc1. Responsive to the high state at its data input, the Q output of flip flop 215 (waveform 615) goes high at clock transition time tc1. The data input to flip flop 215 goes high at time t2 and is also high at clock transition time tc1. The two flip flops 215 and 220 remain in their high states until the next positive transition of the clock at time tc2. Since both flip flops in FIG. 2 are in their high states between times tc1 and tc2, the states of the inputs to EXCLUSIVE OR gate 225 are the same (both high) and a low output is obtained therefrom (waveform 625). Thus, the transition period in the data signal defined as the time interval between times t1 and t2 during which its state is uncertain does not encompass the transition time tc1 of the module clock signal. Since no positive going clock transition occurs during the uncertainty time periods, EXCLUSIVE OR gate 225 remains low and no adjustment of the data signal phase is required.

FIG. 7 shows waveforms that illustrate the operation of the circuit of FIG. 2 for a different data signal input where a positive going clock transition occurs during the transition time uncertainty in the data signal. Waveform 705 in FIG. 7 corresponding to the data signal on lead 205 makes a positive transition at time t1 just prior to the positive going clock transition tc1 of waveform 701 and delayed data signal (waveform 710) corresponding to the output of delay 209 goes positive at time t2 just after the positive clock transition at time tc1. The high state of the data input of flip flop 220 at time tc1 is stored therein as shown in waveform 720 showing the Q output of flip flop 220. The delayed data signal input to flip flop 215, however, is low at time tc1 and the Q output of flip flop 215 (waveform 715) remains in its low state until the next positive transition of the clock at time tc2. Since one data flip flop in FIG. 2 is in its low state while the other data flip flop is in its high state between times tc1 and tc2, the states of the inputs to EXCLUSIVE OR gate 225 are different and a high output is obtained therefrom (waveform 725) between tc1 and tc2. The occurrence of a positive going clock transition in an uncertainty period in the data signal between times t1 and t2 is thereby detected. Similarly, the output of EXCLUSIVE OR gate 225 (waveform 225) is high between clock transition times tc2 and tc3 reflecting the occurrence of the clock transition at time tc2 during a data signal uncertainty period and between clock transition times tc4 and tc6 reflecting the occurrences of clock transitions at times tc4 and tc5 during data signal uncertainty intervals.

In accordance with the invention, the circuit of FIG. 2 provides an uncertainty signal from EXCLUSIVE OR gate 225 when the input data stream signal input the circuit of FIG. 2 has a transition that precedes a positive transition in the clock signal and the delayed data signal transition corresponding thereto occurs after the positive transition in the clock signal. In this event, there is an uncertainty as to the state of the data signal at the prescribed positive going clocking transitions whereby a modification of the data signal phasing is required. The uncertainty period is controlled by the delay of delay line 209 or the difference in delay time between flip flops 215 and 220. Where the transitions of the data signal and the corresponding transitions of the delayed data signal both occur before or both occur after the clocking transitions, the data signal may be clocked without changing the data signal phasing.

FIG. 3 depicts a detailed block diagram of an arrangement useful as one of skew compensation circuits 120-1 through 120-N in FIG. 1 in which the uncertainty detector of FIG. 2 is incorporated. Referring to FIG. 3, delay 302 receives a data signal from an assigned source such as data signal source 101-1 in FIG. 1 through normally enabling AND gate 301 and is operative to shift the phase of the data signal by a prescribed amount. Multiplexer 310 receives the data signal from line 105-1 through AND gate 301 and the phase shifted data signal from delay 302 and applies a selected one of the data signal and the phase shifted data signal to the uncertainty detector comprising flip flops 325 and 330 and EXCLUSIVE OR gate 335. The output of flip flop is the data signal clocked by process or module 110 clock ckM properly times for use in data processing module 110 of FIG. 1. In the event a data signal transition period is detected as encompassing the positive going transitions of module 110 clock ckM, the output of the EXCLUSIVE OR gate changes the state of toggle flip flop 340. Multiplexer 310 is operative in response to the toggling of flip flop 340 to output the other of the data signal and the phase shifted data signal.

Figure 8:
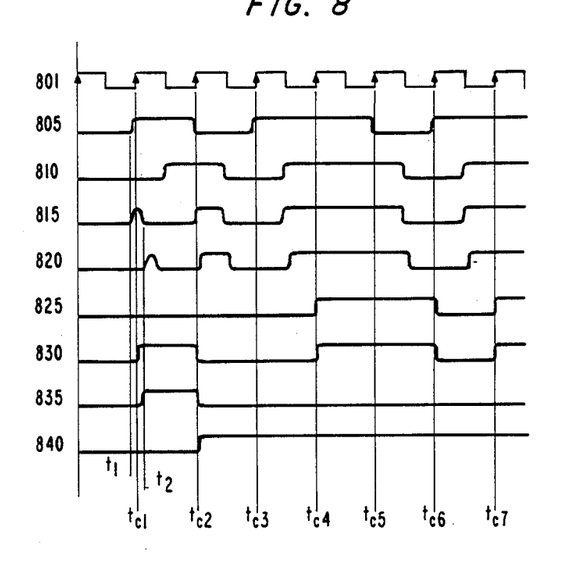
FIG. 8 shows waveforms illustrating the operation of the circuit of FIG. 3.

FIG. 8 shows waveforms illustrating the operation of the skew compensation arrangement of FIG. 3. Waveform 801 corresponds to the processing module clock ckM and the upward directed arrows thereon indicate the occurrences of positive going clock transitions at times tc1, tc2, ... tc7. Waveform 805 shows a data signal pattern incoming from a remote module such as data signal source 101-1 and waveform 810 shows the phase shifted data signal obtained from the output of delay 302. The phase shift provided by delay 302 is sufficient to provide an alternate clocking time for the data signals. As indicated in FIG. 8, the data signal (waveform 805) has its first positive going transition at time t1 just prior to the positive clock transition tc1.

Assume for purposes of illustration that multiplexer 310 is initially conditioned by its select control to transfer the data signal (waveform 805) directly from line 105-1 to its output. The multiplexer output is shown in waveform 815. Delay 320 provides a short delay which determines the uncertainty period in the data signal. This delay may be incorporated in FIG. 3 and is shown as a separate unit but the difference in signal propagation between flip flops 325 and 330 is generally sufficient to define the uncertainty period so that delay 320 may be omitted. Waveform 820 corresponding to the data signal at the output of delay 320 has its first positive going transition at time t2 just after clock transition time tc1. Waveform 815 corresponding to the data signal at the output of multiplexer 310 has its first positive going transition at time t1 just before clock transition time tc1.

The output of multiplexer 310 is applied to the D input of data flip flop 330 while the output of delay 320 is applied to the D input of data flip flop 325. Flip flop 330 changes state at clock transition tc1 since the data signal at its D input is high as shown in waveform 830. Since the D input of flip flop 325 is low until time t2, the Q output of flip flop 325 (waveform 825) remains in its low state during the interval between tc1 and tc2. As aforementioned with respect to FIG. 2, EXCLUSIVE OR gate 335 (waveform 835) goes high responsive to the high signal from flip flop 330 (waveform 830) and the low signal from flip flop 325 (waveform 825) just after the clock transition at time tc1 and remains high until just after the clock transition at time tc2. The high signal from EXCLUSIVE OR gate 335 (waveform 835) is applied to the T input of toggle flip flop 340 and is fed back to the inhibit AND gate 301. The fed back high signal from EXCLUSIVE OR gate 335 (waveform 835) forces the output of AND gate 301 low until just after the clock transition at time tc2 since flip flop 330 (waveform 830) remains in its high state in this interval. Consequently, waveforms 815 and 820 showing the outputs of multiplexer 310 and delay 320, respectively, become and remain low after EXCLUSIVE OR gate 335 (waveform 835) goes high in the interval between clock transition times tc1 and tc2.

At clock transition time tc2, the high signal at the output of EXCLUSIVE OR gate 335 (waveform 835) appearing on the T input of toggle flip flop 340 causes the toggle flip flop to change from its low state to its high state. The high output of flip flop 340 is applied to the select input of multiplexer 310 and modifies its operation so that the phase shifted data signal from delay 302 appears at its output as shown in waveform 815 just after clock transition time tc2. The phase shifted data signal has transitions displaced from the transition times tc3, tc4, . . . tc7, . . . of processing module clock ckM so that there is no uncertainty as to the state of the data signal at these clock transition times. At clock transition times tc3 and tc6, for example, both the output of multiplexer 310 (waveform 815) and delay 320 (waveform 820) are low and the output of EXCLUSIVE OR gate 335 remains low. Similarly, both waveform 815 and 820 are high at clock transition times tc4, tc5 and tc7 whereby EXCLUSIVE OR gate 335 does not change to its high state. Thus, the phase shifted data signal is properly clocked from clock transition time tc3 onward and the effect of the skew between the data signal from data source 101-1 and processing module clock ckM is eliminated in the output of flip flop 330.

Figure 4:
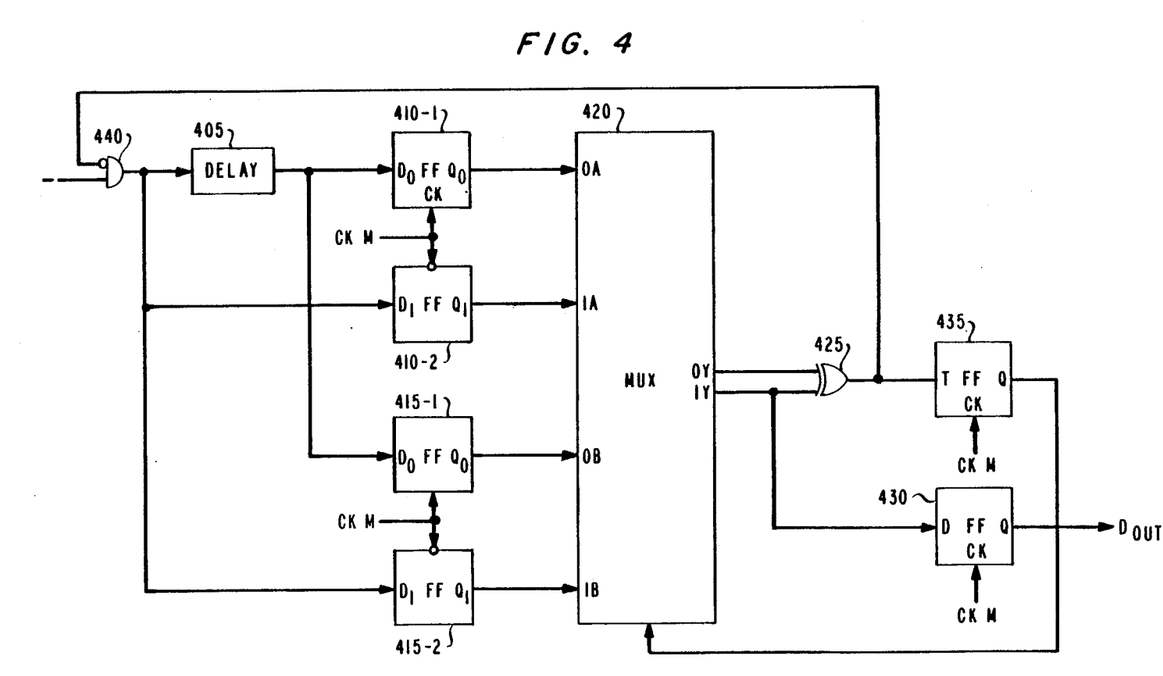
FIG. 4 is a detailed block diagram of a another circuit providing skew compensation for data signals incoming to a processing module that is illustrative of the invention.

FIG. 4 shows a detailed block diagram of another arrangement that may be incorporated in the skew compensation circuits 120-1 through 120-N of FIG. 1. In FIG. 4, the phase shifted data signal is obtained through the use of an input register arrangement (two stage parallel registers 410 and 415) rather than a delay as in FIG. 3 so that the skew compensation circuit is more easily implemented in integrated circuit form. Parallel register 410 comprises stage 410-1 and separate stage 410-2 and parallel register 415 comprises stage 415-1 and separate stage 415-2. The circuit of FIG. 4 includes short delay 405 which as aforementioned may represent the difference in signal propagation time between the individual stages of register 410 and the individual stages of register 415. The circuit of FIG. 4 also includes multiplexer 420. EXCLUSIVE OR gate 425, data flip flop 430, toggle flip flop 435 and AND gate 440.

Referring to FIG 4., AND gate 440 is normally enabled so that a data signal from an assigned source such as data signal source 101-1 in FIG. 1 is applied to the D1 inputs of the register stage 410-2 and register stage 415-2 while the delayed version of the data signal from delay 405 is applied to the D0 inputs of register stages 410-1 and 415-1. Multiplexer 420 receives the Q0 output of register stage 410-1 and the Q1 output of register state 410-2 at its 0A and 1A inputs and also receives the Q0 output of register state 415-1 and the Q1 output of register stage 415-2 at its 0B and 1B inputs. The multiplexer applies a selected set of signals, either the signals its 0A, 1A inputs or its 0B, 1B inputs, to EXCLUSIVE OR gate 425 as signals 0Y and 1Y. EXCLUSIVE OR gates 425 determines whether a data signal transition occurs within a predetermined time period of the prescribed transition of processing module clock ckM. The 1Y output of the multiplexer is also applied to the D input of data flip flop 430. The output of data flip flop 430 (waveform 960) is the ckM clocked data signal available for use in data processing module 110 of FIG. 1. Toggle flop 435 is operative to control the selection of the 0A, 1A and 0B, 1B outputs of registers 410 and 415 in multiplexer 420 and is responsive to the state of EXCLUSIVE OR gate 425. AND gate 440 is inhibited by the high output of EXCLUSIVE OR gate 425.

Figure 9:
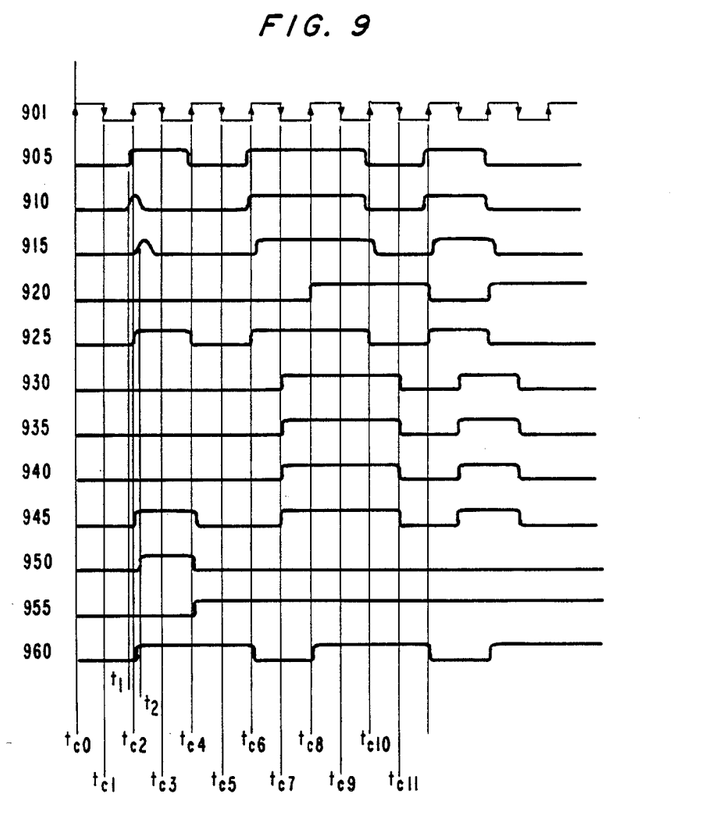
FIG. 9 shows waveforms illustrating the operation of the circuit of FIG. 4.

Waveforms illustrating the operation of the skew compensation arrangement of FIG. 4 are shown in FIG. 9. Waveform 901 corresponds to the processing module clock ckM and the arrows directed up thereon indicate the occurrences of the positive clock transitions at times tc0, tc2, tc4, tc6, tc8, . . . which clock the data signal and the delayed data signal at inputs D0 and D1 of register stages 410-1 and 410-2, respectively. The arrows directed down on waveform 901 indicate the occurrence of negative clock transitions at times tc1, tc3, tc5, . . . which operate to clock the data signal and the delayed data signal at the D0 and D1 inputs of register stages 415-1 and 415-2, respectively. Waveform 905 shows a data stream incoming from a remote module such as data signal source 120-1. Assuming that AND gate 440 is initially enabled to pass the data stream at time tc0, waveform 910 shows the output of AND gate 440 which is applied to the D1 inputs of data flip flops 410-2 and 415-2. Waveform 915 shows the data signal obtained from the output of delay 405 and applied to the D0 inputs of data flip flops 410-1 and 415-1.

As indicated in FIG. 9, the data stream signal (waveform 905) has its first positive going transition at time t1 just prior to the positive clock transition tc2. The D1 input of register stage 410-2 (waveform 910) is high at clock transition time tc2 so that its Q1 output (waveform 925) goes high at time tc2 but the delayed data signal at the D0 input of register stage 410-1 (waveform 915) is low at time tc2 whereby the Q0 output of register stage 410-1 is low (waveform 920). Since the outputs of AND gate 440 and delay 405 are low at negative clock transition times tc1, tc3, and tc5, data register flip flops 415-1 and 415-2 remain in their low states as shown on waveforms 930 and 935. Assume for purposes of illustration that multiplexer 420 is initially conditioned to transfer the Q0 and Q1 signals from register stages 410-1 and 410-2 to its 0Y and 1Y outputs responsive to toggle flop 435 being in its low state (waveform 955). The 0Y and 1Y multiplexer outputs are shown in waveforms 940 and 945, respectively. Consequently, the 0Y output of the multiplexer corresponding to register stage 410-1 is low. The 1Y output of the multiplexer corresponding to register stage 410-2 is high in the interval between tc2 and tc4.

Exclusive or gate 425 goes high in the interval between tc2 and tc4 (waveform 950) owing to the different states on its inputs (waveforms 940 and 945). The high signal from EXCLUSIVE OR gate 425 inhibits the incoming data stream signal from passing through AND gate 440 whereby waveforms 910 and 915 become low after time t2 and before time tc4. The high signal from EXCLUSIVE OR gate 425 appearing at the T input of toggle flop 435 causes the toggle flop to switch to its high state at positive clock transition time tc4. This, in turn, modifies the operation of multiplexer 420 so that the Q0 and Q1 outputs of register stages 415-1 and 415-2 are coupled therethrough to the inputs of EXCLUSIVE OR gate 425.

As aforementioned, The data signal and its delayed version are clocked into register 415 at negative clock transition times tc1, tc3, tc5,. The data signal and its delayed version applied to the D0 and D1 inputs of register stages 415-1 and 415-2 are clocked into the register at a different phase with respect to the clock transitions at times tc0, tc2, tc4, tc6 . . . .. At this phase relationship, there are no data signal transitions in the vicinity of the odd numbered clock transitions. At clock transition times tc5 and tc11, for example, both the data signal and its delayed version are low at the D0 and D1 inputs of register stages 415-1 and 415-2. Similarly, both the data signal and its delayed version at the D0 and D1 inputs of register stages 415-1 and 415-2 are high at clock transition times tc7 and tc9. Consequently EXCLUSIVE OR gate 425 which detects uncertainty in the state of the data signal at clock transition times remains low and skew compensation is achieved.

Figure 5:
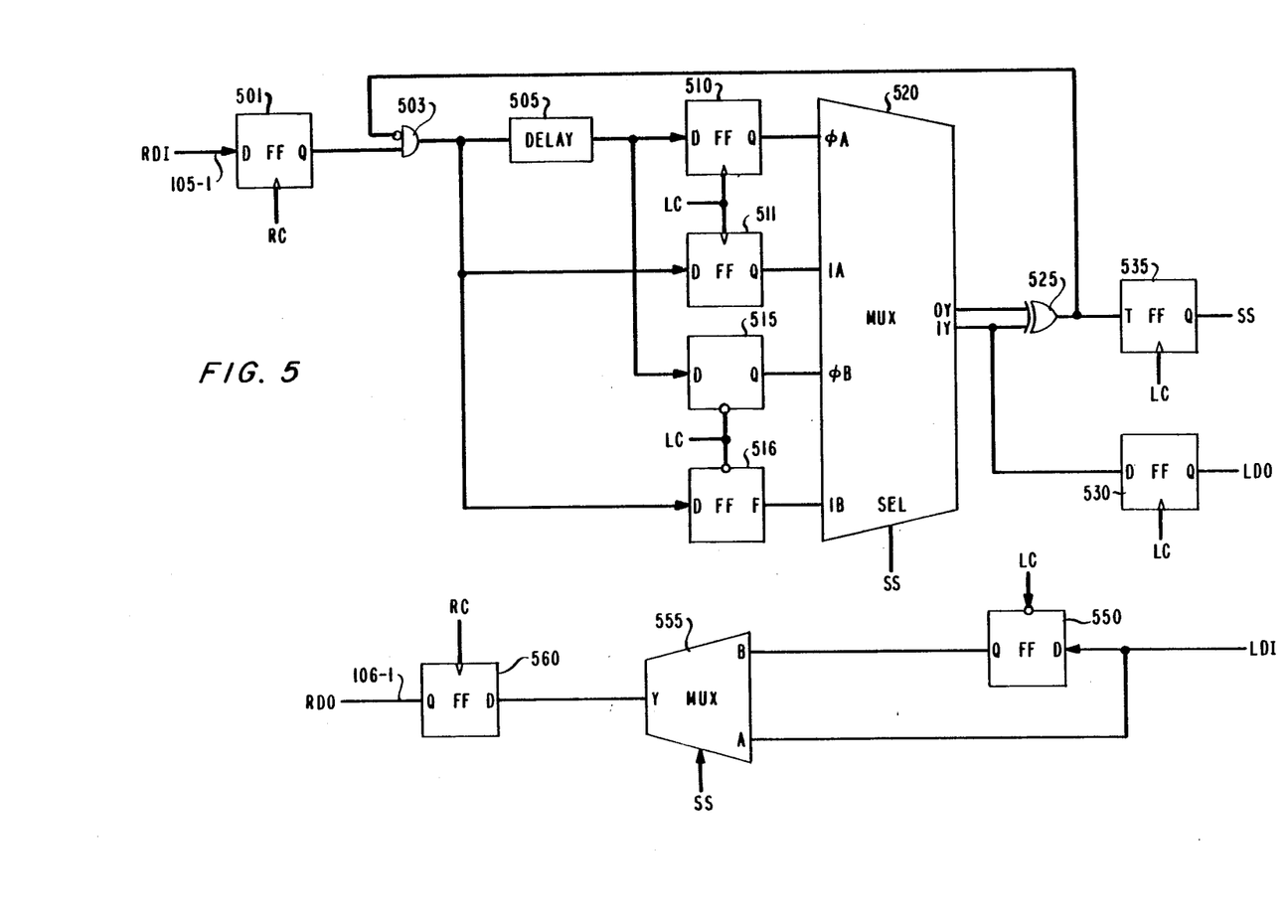
FIG. 5 is a detailed block diagram of another circuit providing skew compensation for data signals incoming to and outgoing from a processing module that is illustrative of the invention.
Figure 10:
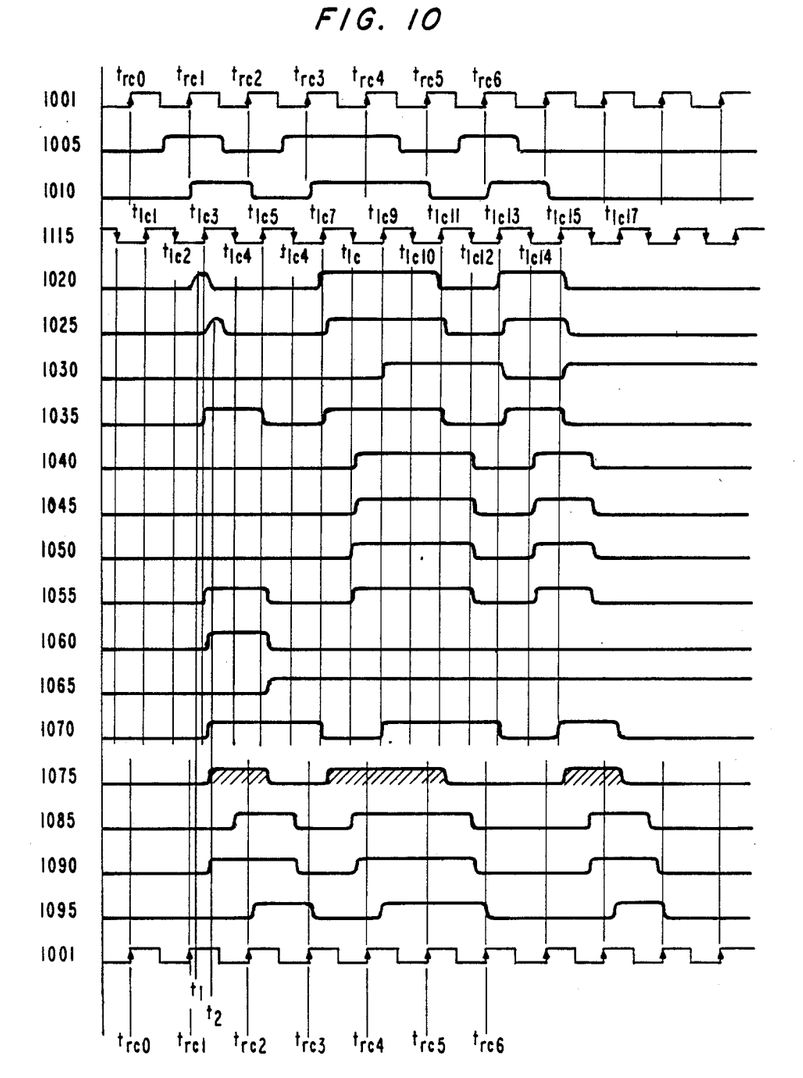
FIG. 10 shows waveforms illustrating the operation of the circuit of FIG. 5.

The circuits of FIGS. 3 and 4 are operative to compensate for skew between a processing module clock and data signals incoming to the processing module. In the event that data signals are exchanged between processing module 110 in FIG. 1 and a remote module such as source 101-1 connected thereto, it is useful to adjust the timing of the signals into the processing module from the source to the processing module clock and also to adjust the timing of the data signals outgoing from the module to the clock of the source to provide skew compensation in both directions at the processing module. FIG. 5 depicts a block diagram of a circuit adapted to provide skew compensation for signals coupled into a processing module e.g. 110 from a source e.g. 101-1 and data signals outgoing from the processing module 110 to the same source 101-1 and FIG. 10 shows waveforms illustrating the operation of the circuit of FIG. 5. The skew compensation arrangement according to the invention may be adapted to perform the two way skew compensation since the skew in one direction is fixed relative to the skew in the other direction.

In FIG. 5, a data stream RDI from a remote source (e.g. source 101-1 in FIG. 1) is input to skew compensation circuit 120-1 via line 105-1 and a data stream RDO outgoing from data processing module 110 to the source is applied to the remote source 101-1 via line 106-1. The clock signal from source 101-1 shown in waveform 1001 of FIG. 10 uses a positive going transitions to clock signals. The local clock signal LC at data processing module 110 is shown in waveform 1015. While both the remote source and local processor clock signals are operating at the same frequency, the phase relationship between the two is not restricted as shown in waveforms 1001 and 1015. Skew compensation circuit 120-1 is operative to provide appropriate clocking for both data streams.

Referring to FIGS. 5 and 10, data signal RDI shown in waveform 1005 of FIG. 10 is applied to the D input of flip flop 501. Flip flop 501 is operative to store the state of data signal RDI at each positive transition of the remote clock RC (waveform 1001). Flip flop 501 is placed in its high state at times trc1, trc3, trc4 and trc6 and is placed in its low state at times trc0, trc2, trc5 and trc7 and provides a signal at its Q output as shown in waveform 1010. The clocked RDI data stream is applied from the Q output of flip flop 501 directly to the D inputs of data flip flops 511 and 516 via normally enabled AND gate 503 and through AND gate 503 and delay 505 to the D inputs of data flip flops 510 and 515. Flip flops 510 and 511 are clocked by the processing module clock LC (waveform 1115) at each positive transition thereof. Flip flops 515 and 516 are clocked at each negative transition of the processing module clock LC 180 degrees out of phase with flip flops 510 and 511. As will be explained more fully, the time delay through delay element 505 is set to correspond to the propagation delay of the path for the outgoing data signal generated in processing module 110 through flip flop 550, multiplexer 555 and flip flop 560.

Waveform 1020 shows the remote data stream clocked by remote module clock RC applied from the output of AND gate 503 to the D input of flip flops 511 and 516. Waveform 1025 shows the delayed remote data signal clocked by remote module clock RC applied from the output of delay 505 to the D inputs of flip flops 510 and 515. The D input of flip flop 511 is high at time t1 (waveform 1020) and the flip flop stores the high state at its D input at positive clock transition time tlc3 as shown in waveform 1035. Flip flop 510 receives the delayed remote data stream from delay 505 (waveform 1025) which remains low until time t2 after clock transition tlc3. Consequently, flip flop 510 (waveform 1030) remains in its low state after clock transition tlc3. Flip flops 515 and 516 are clocked at the negative transitions of clock signal LC and their Q outputs (waveforms 1040 and 1045) remain low at time tlc3. Multiplexer 520 is controlled by select signal SS from the Q output of toggle flop 535 to pass the Q outputs of either data flops 510 and 511 or data flops 515 and 516. Toggle flop is in its low state prior to time tlc5. The multiplexer output signals 0Y and 1Y are shown in waveforms 1050 and 1055, respectively. Multiplexer 520 is conditioned by the low select signal SS to pass the Q outputs of Flip flops 510 and 511 at multiplexer inputs 0A and 1A to the inputs of EXCLUSIVE OR gate 525.

The output of EXCLUSIVE OR gate 525 (waveform 1060) is high between times tlc3 and tlc5 responsive to one input being low and the other input being high. The high output of EXCLUSIVE OR gate 525 is applied to the T input of toggle flop 535 and the inhibit input of AND gate 503. AND gate 503 is inhibited just after positive clock transition tlc3 of the CL clock (waveform 1015) so that the dat stream inputs to flip flops 510, 511, 515 and 516 (waveforms 1020 and 1025) become low. At time tlc5, toggle flop 535 is placed in its high state since its T input is high at the tlc5 positive clock transition. A high SS signal is thereby obtained responsive to the high output of EXCLUSIVE OR gate 525. Flip flop 511 returns to its low state just after tlc5 so that the output of EXCLUSIVE OR gate 525 becomes low. AND gate 503 is no longer inhibited. After time tlc5, signal SS from toggle flop 535 is high and the Q outputs of flip flops 515 and 516 (waveforms 1040 and 1045) are applied to the inputs of EXCLUSIVE OR gate 525 via the 0B and 1B inputs of multiplexer 520. According to the invention, data transitions occurring within a specified time interval of the positive transitions of the processing module clock LC are detected and the data stream is phase shifted to remove such data stream transitions from the time of occurrence of the positive transitions.

After time tlc5, high select signal SS causes the Q outputs of flip flops 515 and 516 to be applied to EXCLUSIVE OR gate 525. These flop flops are clocked by the negative transitions of local clock LC (waveform 1015). The timing of input data stream is thereby shifted in response to detection of data transitions in the immediate vicinity of the positive transitions of the local clock LC. As is evident from waveforms 1020 and 1025, the D inputs of data flip flops 515 and 516 are both low at times tlc6 and tlc12 and are high at tlc8, tlc10 and tlc14. Since the inputs of EXCLUSIVE OR gate 525 from the Q outputs of data flip flops 515 and 516 (waveforms 1040 and 1045) are in the same state, the output of the EXCLUSIVE OR gate (waveform 1060) remains low after time tlc5 and the Q output of toggle flop 535 (waveform 1065) remains in its high state. The output of the skew compensation circuit is signal LDO from flip flop 530 which is shown in waveform 1070. Flip flop 530 receives its D input from the 1Y output of multiplexer 520 (waveform 1055) and is clocked by the positive transitions of local clock LC (waveform 1015). The skew correction takes place between times t1 and tlc6 so that the correctly clocked data signal is assured at time tlc6.

The data stream LDI that is generated in processing module 110 and sent therefrom to remote module 101-1 is shown in waveform 1075. Data stream LDI is applied directly to the A input of multiplexer 555 and to the D input of data flip flop 550. Flip flop 550 is clocked by the negative transitions of clock LC (waveform 1015) and its Q output is shown in waveform 1085. Thus, the A input of multiplexer 555 receives a data stream clocked by the positive transitions of clock LC while the B input of multiplexer 555 receives a phase shifted version of the data signal since data flip flop 550 is clocked by the negative transitions of clock LC. The output of multiplexer 555 is shown in waveform 1090. Prior to time tlc5, multiplexer 555 is conditioned by the low state of signal SS from toggle flop 535 to pass the data stream at its A input (waveform 1075) to data flip flop 560. After toggle flop 535 is placed in its high state at time tlc5, multiplexer 555 passes the phase shifted data signal on its B input (waveform 1085) to the D input of Flip flop 560.

Data flip flop 560 is clocked by the clock signal RC from remote module 101-1 (waveform 1001) so that it changes state at the positive transitions thereof. After time tlc5, the appropriate phase relationship is established between the incoming data signal and the processor module clock LC. This relationship is also correct for the transfer of data signals from processing module 110 to remote module 101-1 so that the skew compensation circuit of FIG. 10 is also operative to remove skew from the LDI data signal being transferred to the remote module. There are no data stream uncertainties at the positive transitions of remote clock RC at the output of multiplexer 555 (waveform 1090) after time tlc5 and the output of flip flop 560 (waveform 1095) clocked by remote clock RC correctly follows the output data stream RDO of waveform 1075.

The invention has been illustrated and described with reference to particular embodiments thereof. It is to be understood, however, that various changes and modification may be made by those skilled in the art without departing from the spirit and scope of the invention.

What is claimed is:

1. A circuit for adjusting the timing of data signals in a clocked digital processing module comprising;
   means for generating a clock signal at a prescribed clock transition rate;
   means for receiving an input data signal at the digital processing module, said received data signal being clocked at the prescribed clock transition rate;
   means responsive to the input data signal for generating a data signal having a predetermined delay with respect to said input data signal;
   means for storing the state of said input data signal at the occurrence of a transition in said clock signal;
   means for storing the state of the data signal having the predetermined delay at the occurrence of said transition in said clock signal; and
   means responsive to the stored state of the input data signal at said transition being different from the stored state of the data signal having the predetermined delay at said transition for generating a signal indicating an uncertainty in the state of the input data signal at the occurrence of said transition in said clock signal.

2. A circuit for adjusting the timing of data signals in a clocked digital processing module according to claim 1 wherein
   the means for storing the state of said input data signal at the occurrence of a transition n said clock signal comprises a first flip flop responsive to a prescribed transition in said clock signal for storing the state of the data signal at said prescribed transition; and
   the means for storing the state of the data signal having the predetermined delay at the occurrence of said prescribed transition in said clock signal comprises a second flip flop responsive to the prescribed transition in said clock signal for storing the state of the data signal having the predetermined delay at the prescribed transition.

3. A circuit for adjusting the timing of data signals in a clocked digital processing module according to claim 2 wherein
   the means for generating a signal indicating an uncertainty in the state of the input data signal at the occurrence of said transition in said clock signal comprises a digital circuit having one input for receiving the stored state of the first flip flop at the time of said prescribed clock transition, another input for receiving the stored state of the second flip flop at the time of the prescribed clock transition, said digital circuit being responsive to a difference in the stored states of the first and second flip flops for generating the uncertainty indicating signal.

4. A circuit for adjusting the timing of data signals in a clocked digital processing module according to claim 3 wherein said digital circuit comprises an EXCLUSIVE OR circuit.

5. A circuit for adjusting the timing of data signals in a clocked processing module comprising;
   means for generating a clock signal at a prescribed transition rate;
   means in said clocked processing module for receiving an input data signal clocked at the prescribed clock transition rate;
   first means for storing the state of said input data signal at the occurrence of a transition in said clock signal;
   second means for storing the state of said input data signal at a time delayed a predetermined amount from the occurrence of the transition in said clock signal; and
   means responsive to the stored state of said first storing means being different from the stored state of said second storing means for generating a signal indicating an uncertainty in the state of the input data signal at the occurrence of said transition in said clock signal.

6. A circuit for adjusting the timing of data signals in a clocked processing module according to claim 5 wherein
   said first storing means comprises a first flip flop having an input to which said input data signal is applied, a clock input to which said clock signal is applied and an output,
   said second storing means comprises a second flip flop having an input to which said input data signal is applied, a clock input to which said clock signal is applied and an output,
   each of said first and second flip flops having a different response time for storing the state of the input data signal; and
   said means for generating an uncertainty signal comprises logic means having a first input coupled to the output of said first flip flop and a second input coupled to the output of said second flip flop, said logic means being responsive to the output of said first flip flop being different from the output of said second flip flop for producing a signal indicating the uncertainty the state of the input data signal at the occurrence of said transition In said clock signal.

7. A circuit for adjusting the timing of data signals in a clocked digital processing module comprising;
 means for generating a clock signal for said processing module at a prescribed transition rate;
 means for receiving an input data signal at said prescribed transition rate;
 means for generating a data signal at said prescribed transition rate having a predetermined phase relationship to said input data signal;
 means for selecting one of said input data signal and said data signal having the predetermined phase relationship to said input data signal;
 means for detecting an uncertainty in the state of the selected one of said input data signal and said data signal having the predetermined phase relationship to said input data signal at the occurrence of a transition in said clock signal; and
 means responsive to the detected uncertainty signal for altering the selecting means to select the other of said input data signal and said data signal having the predetermined phase relationship to said input data signal.

8. A circuit for adjusting the timing of data signals in a clocked digital processing module according to claim 7 wherein said uncertainty detecting means comprises;
 means for delaying the selected data signal by a prescribed time period;
 means for storing the state of said selected data signal at the occurrence of a transition in said clock signal;
 means for storing the state of the delayed selected data signal at the occurrence of a transition in said clock signal; and
 means responsive to the stored state of the selected data signal being different from the stored state of the delayed selected data signal for generating a signal indicating an uncertainty in the state of the selected data signal at the occurrence of the transition in said clock signal.

9. In a system having a plurality of clocked digital processing modules, a circuit for timing data signals in one of the clocked digital processing modules comprising:
 means for generating a clock signal having a prescribed transition rate in each of said processing modules;
 means for receiving an input data signal from another of said processing modules at said prescribed clock transition rate;
 means for receiving the clock signal from said other processing module;
 means responsive to the clock signal received from said other processing module for clocking the input data signal to be isosynchronous with the transitions of the clock signal received from said other processing module;
 means responsible to the other processing module clock signal and the input data signal received from the other processing module clocked with the received clock signal for generating an clocked input data signal at said prescribed transition rate having a predetermined phase relationship to said input data signal clocked with the clock signal from the other processing module;
 means for selecting either said other processing module clocked input data signal or said other processing module clocked data signal having the predetermined phase relationship to said other processing module clocked input data signal;
 means for detecting an uncertainty in the state of the selected other processing module clocked input data signal at the occurrence of the transitions in the clock signal of the one processing module; and
 means responsive to the detected uncertainty signal for altering the selecting means to select the other of said other processing module clocked input data signal and said input data signal having the predetermined phase relationship to said other processing module clocked input data signal.

10. In a system having a plurality of clocked digital processing modules, a circuit for timing data signals in one of the clocked digital processing modules according to claim 9 further comprising:
 means for receiving a data signal from said one processing module to be outgoing to said other processing module;
 means responsive to said outgoing data signal for generating an outgoing data signal having a predetermined delay with respect to said received outgoing data signal;
 means responsive to said selection signal for selecting one of said received outgoing data signal and said outgoing data signal having a predetermined delay with respect to said received outgoing data signal;
 means responsive to said other processing module clock signal for clocking said selected one of the outgoing data signal and said outgoing data signal having a predetermined delay with respect to said received outgoing data signal; and
 means for transferring the clocked selected one of the outgoing data signal and the outgoing data signal having a predetermined delay with respect to said received outgoing data signal to said other processing module.

11. A circuit for adjusting the timing of data signals in a clocked digital processing module according to claim 9 or claim 10 wherein said uncertainty detecting means comprises:
 means for delaying the selected input data signal by a prescribed time period;
 means for storing the state of said selected input data signal at the occurrence of a transition in said clock signal of the one processing module;
 means for storing the state of the delayed selected input data signal at the occurrence of a transition in said clock signal of the one processing module; and
 means responsive to the stored state of the selected input data signal being different from the stored state of the delayed selected data signal for generating a signal indicating an uncertainty in the state of the selected input data signal at the occurrence of the transition in said clock signal of the one processing module.

* * * * *